United States Patent [19]
Hamblen

[11] Patent Number: 5,159,495
[45] Date of Patent: Oct. 27, 1992

[54] GRADED INDEX OPTICAL ELEMENTS AND CATADIOPTRIC OPTICAL SYSTEMS

[75] Inventor: David P. Hamblen, Rochester, N.Y.

[73] Assignee: Eastman Kodak Company, Rochester, N.Y.

[21] Appl. No.: 626,668

[22] Filed: Dec. 11, 1990

[51] Int. Cl.$^5$ ............................................. G02B 17/08
[52] U.S. Cl. .................... 359/731; 359/654; 359/727; 359/730; 359/736
[58] Field of Search ............................. 350/442–446; 359/726, 727, 728, 732, 652, 654, 730, 731, 736

[56] References Cited

U.S. PATENT DOCUMENTS

| | | | |
|---|---|---|---|
| 4,022,855 | 5/1977 | Hamblen | 264/1 |
| 4,061,420 | 12/1977 | Kaprelian et al. | 350/199 |
| 4,215,914 | 8/1980 | Muchel et al. | 350/175 |
| 4,331,390 | 5/1982 | Shafer | 350/444 |
| 4,342,503 | 8/1982 | Shafer | 350/443 |
| 4,364,639 | 12/1982 | Sinclair et al. | 350/331 |
| 4,457,590 | 7/1984 | Moore | 350/413 |
| 4,523,816 | 6/1985 | Kreitzer | 350/444 |
| 4,554,448 | 11/1985 | Sillitto | 250/216 |
| 4,789,219 | 12/1988 | Layne | 350/97 |
| 4,981,343 | 1/1991 | Folsom | 350/443 X |

FOREIGN PATENT DOCUMENTS 2169723A 1/1986 United Kingdom .

Primary Examiner—Scott J. Sugarman
Attorney, Agent, or Firm—Charles E. Snee, III

[57] ABSTRACT

The present invention relates to an optical element and catadioptric optical systems using the optical element. The optical element has a spherical surface with a reflective layer formed on at least a portion of the surface, and is formed of a radiant energy transmitting material having a radial gradient index of refraction. The catadioptric optical systems include at least two optical elements at least one of which is refractive, and at least one of which has a gradient index therein. One optical system includes first and second optical elements disposed sequentially along a longitudinal axis of the system. The second optical element is the optical element with the gradient index. The first optical element is formed of a homogeneous light transmitting material and includes a spherical surface, and a reflective layer formed on a central portion of one of the spherical surface.

34 Claims, 5 Drawing Sheets

FIG. 5
RAY INTERCEPT

FIG. 6
OPTICAL PATH DIFFERENCE

FIG. 7
ASTIGMATISM

FIG. 8
MODULATION TRANFER FUNCTION

GRADED INDEX OPTICAL ELEMENTS AND CATADIOPTRIC OPTICAL SYSTEMS

FIELD OF THE INVENTION

The present invention relates to graded index optical elements and catadioptric optical systems including such optical elements for use in, for example, camera or astronomical optical systems.

BACKGROUND OF THE INVENTION

Reflective optical systems with a concave mirror (catoptric), a combination of lenses (dioptric), or a combination of at least one lens and a mirror (catadioptric), are being increasingly used, especially for telephoto lenses. The main reason for using a combined system of lenses and mirrors instead of just lenses is to reduce weight and the cost of optical quality glass required to make large lenses with low f-numbers. It is possible to fold up an optical system into a very compact space by integrating mirrors and lenses.

U.S. Pat. No. 4,061,420 discloses a catadioptric telephoto optical system. The optical system comprises a Mangin mirror as the primary mirror, an aspheric corrector plate wherein a rear surface thereof acts as a secondary mirror, and a pair of air spaced corrector lenses located between the primary and secondary mirrors. In operation, light passes through the aspheric corrector plate and is reflected from the primary mirror and then the secondary mirror. After reflection from the secondary mirror, the light passes through the pair of corrector lenses, and then through an aperture defined by the primary mirror for imaging onto an image plane.

U.S. Pat. No. 4,342,503 discloses various arrangements for two element catadioptric telescopes. A first element comprises a relatively thin light transmissive shell which is concave towards the front of the telescope. A front surface of the first element includes a spherical shape and a rear opposing surface includes an aspheric shape, or vice versa. A central portion of the first element on either the rear surface or the front surface is mirrored to form a secondary mirror of the telescope. A second element comprises a primary mirror which is concave towards the front of the telescope. Additionally, in certain embodiments the second element comprises a light transmissive shell which is spherical on a front surface and aspheric on a back surface, or vice versa. One of these surfaces is mirrored to form the primary mirror of the telescope. In operation, light passes through the first element and is reflected from the primary mirror of the second element and then from the secondary mirror of the first element. After reflection from the secondary mirror, the light passes through an aperture defined in the second element and is imaged on an image plane.

In designing catoptric, dioptric or catadioptric systems, the following advantages and disadvantages of mirrors over lenses must be considered. With reference to the advantages of mirrors over lenses, mirrors can be made in larger diameters than lenses because lenses are essentially limited to a diameter of around 20 inches due to optical limitations. Mirrors, unlike lenses, have no chromatic aberration and, hence, can be focused over the ultraviolet (UV) to infrared (IR) wavelength region. Additionally, a mirror requires only one-quarter of the curvature of a lens having the same power and thereby allows a high relative aperture without introducing excessive aberration residuals.

With regard to the disadvantages of mirrors over lenses, a small diameter centralized mirror obstruction in the path of the entering beam of radiant energy causes some loss of radiant energy collection. Additionally, a reflective surface of a mirror must conform extremely closely to a desired shape because all of the focusing power of the mirror is confined to one surface. Further, a required aspheric surface shape of a mirror is difficult to generate with good optical quality. Still further, an angular field acceptance angle of a mirror system is restrictive. Consequently, the size of the mirror system must be increased by the addition of one or more lens elements.

It is desirable to produce an optical system which reduces the effects of the above mentioned limitations of mirrors and lenses and permits such optical system to be made without use of an aspheric surface.

SUMMARY OF THE INVENTION

The present invention is directed to optical systems wherein the surfaces of optical elements are spherical, and a body of one of the optical elements comprises a radial gradient index of refraction with a profile to cause a spherical surface to appear aspherical with respect to incident ray bending.

More particularly, a first optical system in accordance with the present invention comprises an optical element comprising a body with opposing first and second spherical surfaces each of which extends radially outward from a longitudinal axis of the optical system, and a layer of a radiant energy reflective material disposed on at least a portion of the second surface of the optical element. The body of the optical element comprises a radiant energy transmitting material having a radial gradient index of refraction of a preselected profile.

A second optical system in accordance with the Present invention comprises an optical element, and a reflecting member which is separated from the optical element along a longitudinal axis of the system. The optical element comprises the form described hereinabove for the optical element of the first optical system. The reflecting member comprises a spherical reflecting surface which extends radially outwards from the longitudinal axis of the optical system. The combination of the reflecting member and the optical element images radiant energy received from a remote area onto an image plane.

First and second preferred embodiments of the second optical system provide for passage of the radiant energy from the remote area either once or twice through the optical element.

The invention will be better understood from the following more detailed description and the accompanying drawings and claims.

BRIEF DESCRIPTION OF THE DRAWINGS

The drawings are not necessarily to scale, and corresponding elements in the various figures have the same reference designations.

DETAILED DESCRIPTION

Figure 1:
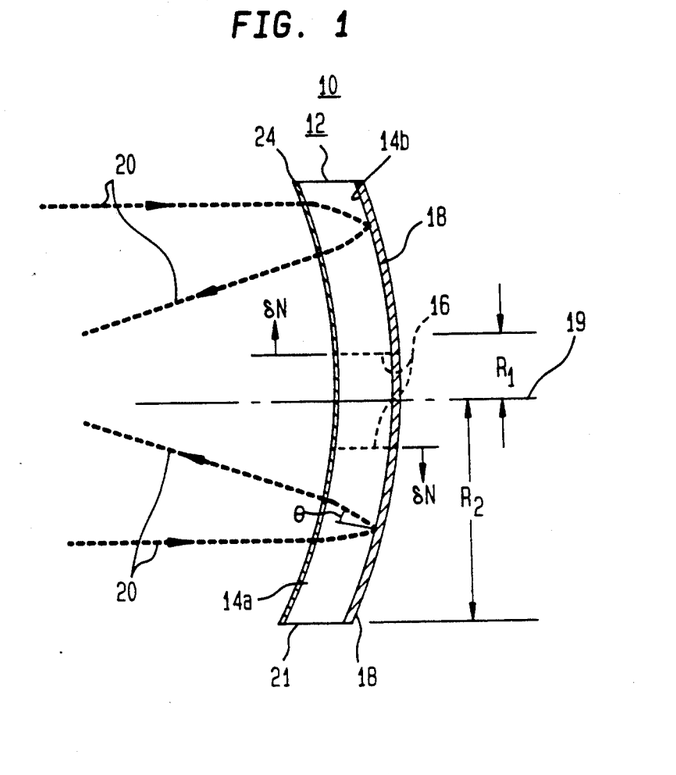
FIG. 1 is a cross sectional view through the center of a first optical system in accordance with the present invention.

Referring now to FIG. 1, there is shown a cross sectional view through the center of an optical element 10 in accordance with the present invention. The optical element 10 comprises a body 12 with opposing front and rear surfaces 14a and 14b, respectively, and a layer 18 of a reflective material (e.g., silver) on the rear surface 14b of the body 12. The rear surface 14b is spherical while the front surface 14a can have a spherical or aspherical shape. The body 12 is formed of a radiant energy (e.g., light) transmitting material (e.g., glass, plastic) which includes a radial gradient index of refraction. Additionally, an optional anti reflective coating 24 of any well-known suitable material is formed on the front surface 14a of the body 12 to minimize Fresnel reflection loss of radiant energy incident on the front surface 14a. The coating 24, the body 12 and the layer 18 define an optional aperture 16 through the centers thereof. When the optional aperture 16 is present, a baffle (not shown) which is similar to that shown in U.S. Pat. No. 4,342,503 can be formed or mounted on the front surface 14a around the aperture 16 to minimize interference due to such Fresnel reflection loss. It is to be understood that the front surface 14a and the rear spherical surface 14b can have two different configurations (i.e., radii of curvature, or aspherical/spherical shapes) to provide desired focal properties to reduce astigmatism, or coma. Rays 20 of radiant energy (e.g., light) from a remote area are incident on front surface 14a of optical element 10 and are refracted towards the rear spherical surface 14b.

The body 12 of optical element 10 is formed by any suitable process as, for example, a spin (centrifugal) molding method described in U.S. Pat. No. 4,022,855. A reusable mold, for example, of silicone rubber, is made defining a cavity having the outer configuration of the body of the optical element to be produced. The mold is then placed in a rotatable mold carrier and rotated about its center axis, which corresponds to an optical axis 19 of the optical element 10. While the mold and the carrier are being spun, two copolymerizable materials having different indices of refraction are injected into the mold in a predetermined sequence to interdiffuse therein. The speed of the mold and carrier rotation are reduced and the interdiffusing materials form a polymerization mixture which has an index of refraction that varies radially outwards from the axis of rotation. More particularly, where the materials are predetermined photopolymers, ultraviolet radiation and post baking, if necessary, produce a solid optical element requiring no further optical finishing. In accordance with the present invention, once the body 12 of the optical element 10 is produced, the desired surface (e.g.. surface 14b) is coated with the layer 18 of reflective material.

Figure 2:
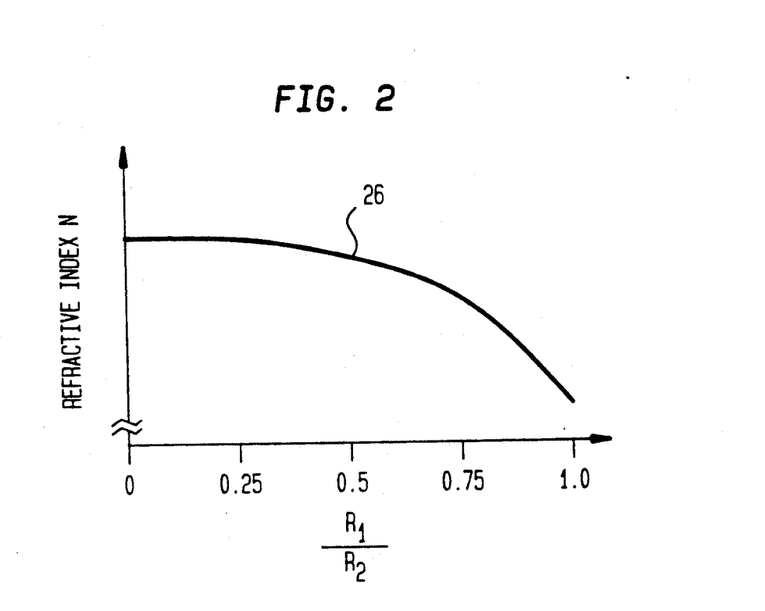
FIG. 2 is an exemplary graph of the index of refraction versus the radius for the first optical system of FIG. 1.

Referring now to FIG. 2, there is shown an exemplary curve 26 of the gradient index of refraction N along the radius $R_2$ on the vertical axis versus increasing radii equal to $R_1/R_2$ on the horizontal axis for the optical element 10 of FIG. 1. As shown in FIG. 1, $R_1$ represents an instantaneous radial distance from the longitudinal optical axis 19 of the optical element 10 through the center of aperture 16 (if present) being measured at any instant, and $R_2$ represents a fixed radial distance from the longitudinal optical axis 19 to an outside edge 21 of the body 12 of the optical element 10. The curve 26 indicates a refractive index which changes parabolically across the radius of the body 12 in accordance with a preferred embodiment of the present invention. The parabolic profile of curve 26 is used for the discussion hereinafter of the optical element 10. However, it is to be understood that the curve of the gradient-index can have any suitable profile. The body 12, including the gradient-index profile shown in FIG. 2, has, in its preferred embodiment, a relatively smaller index of refraction adjacent to the outside edge 21 thereof which increases radially according to the curve 26 to the central aperture 16 and then drops off to air if the aperture 16 is present. It is to be understood that an inverse parabolic gradient-index profile can also be used where the minimum index of refraction is adjacent to the aperture 16 and increases radially outward in a parabolic profile to the outside edge 21.

An exemplary optical element 10 formed in accordance with the present invention includes a radius $R_2$ of 60 mm, a thickness between surfaces 14a and 14b of 4 mm, and an aperture 16 having a diameter of 10 mm. An exemplary first material used to make body 12 is Allyl Diglycol Carbonate with an index of refraction of 1.4800, and an exemplary second material used to make body 12 is Diallyl Isophtalate with an index of refraction of 1.5700. Allyl Diglycol Carbonate is a proprietary material manufactured or synthesized by the Pittsburgh Plate Glass (PPG) Corporation, while Diallyl Isophtalate is a proprietary material manufactured or synthesized by Polysciences, Inc. The exemplary body 12 is formed using the above-mentioned first and second materials, and the spin molding process as described above and in U.S. Pat. No. 4,022,855. The mold and carrier are spun at appropriately 10.000 RPM to form the parabolic radial index gradient. By using the two exemplary materials listed above, a resultant body 12 was produced wherein the indices of refraction in the profile of FIG. 2 ranged from approximately 1.56 to approximately 1.50.

In operation, rays 20 of a radiant energy, such as light, arrive from a remote area and are incident on the front surface 14a except for those rays 20 arriving in the area of aperture 16 or beyond outside edge 21. Those rays 20 which are incident on the front surface 14a enter the optical element 10 and propagate therethrough. Within the optical element 10, each ray 20 propagates along a separate path which is curved towards the longitudinal axis 19 by an amount which is dependent on the radial gradient indices encountered by the ray 20. Each ray 10 which is incident on the back spherical surface 14b of the optical element 10 with a separate angle of incidence $\theta$, is reflected by the reflecting layer 18 and propagates through optical element 10 for a second time. The return path of each ray 20 is also curved through the optical element 10 dependent on the radial gradient indices encountered by the reflected ray 20. Each reflected ray 20 exits the front surface 14a of the optical element 10 and is directed towards a distant focal point (not shown). More particularly, the reflected rays 20 are bent in the gradient region in order to be preferably redirected to the distant focal point.

Figure 3:
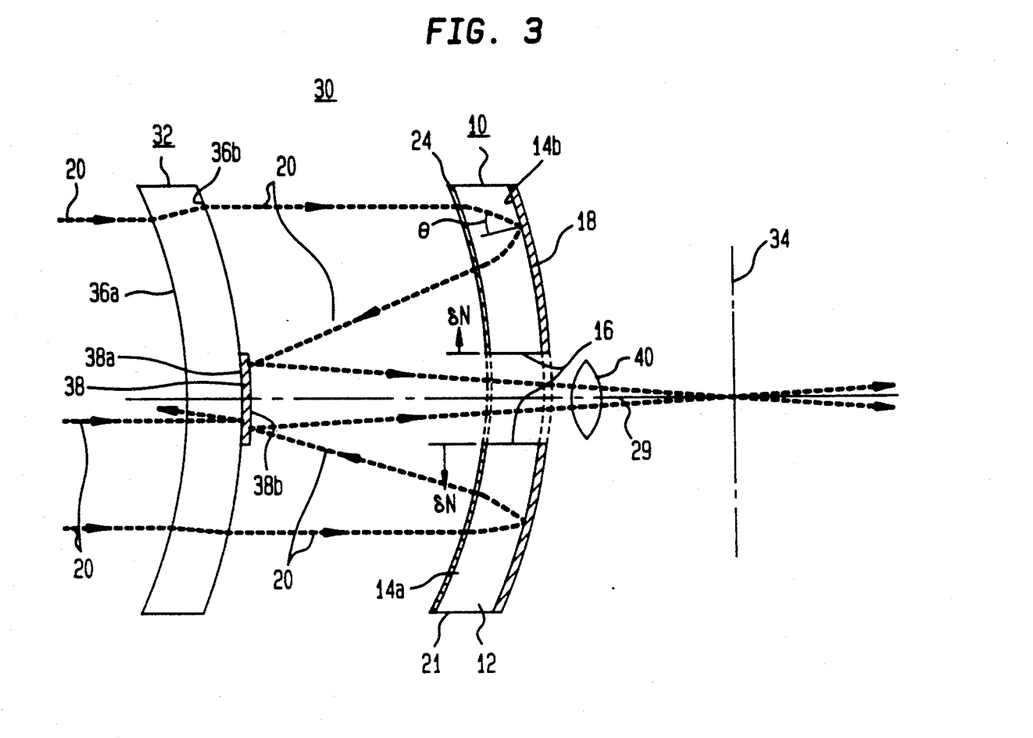
FIG. 3 is a side cross sectional view through the center of a second optical system in accordance with the present invention.

Referring now to FIG. 3, there is shown a side cross sectional view through the center of a Cassegrain design optical system 30 in accordance with the present invention. The optical system 30 comprises a lens 32, and the optical element 10 of FIG. 1 in that sequence along a longitudinal axis 29 of the system 30. An image generated by system 30 from rays 20 of radiant energy incident thereon from a distant area is formed on an image plane 34 disposed behind optical element 10 along the longitudinal axis 29 of the system 30. The lens 32 comprises a front surface 36a, a rear spherical surface 36b, and a reflective coating 38 disposed on central portion of the rear surface 36b. The lens 32 is formed of any suitable homogeneous radiant energy transmitting material with a predetermined index of refraction.

In operation, rays 20 of radiant energy (e.g., light) arrive from a remote area and enter the front surface 36a. These rays 20 are refracted slightly through the lens 32. The rays 20 which propagate in lens 32 and are incident on the limited area of interruption at a first surface 38a of the reflective coating 38 (on the rear spherical surface 36b of lens 32) are reflected back towards the remote area. For illustrative purposes, only one of the rays 20 which are incident on the first surface 38a of the reflective coating 38 is shown. The majority of rays 20 which propagate in lens 32, and are not incident on the first surface 38a of the reflective coating 38, exit the rear spherical surface 36b of lens 32 and are directed towards the optical element 10. The rays 20 incident on the optical element 10 pass through the body 12 of the optical element 10, and are reflected (as described hereinbefore) back through and out of the body 12 and focused by optical element 10 towards the reflective coating 38 on the lens 32. It is to be understood that the reflection of the rays 20 off the reflective layer 18 on the spherical surface 14b causes the rays 20 to pass through the gradient index material of the body 12 of the optical element 10 twice. This reduces the required radial refractive index change (δN in the curve shown in FIG. 2) to achieve the same effect as found in an optical element 60 described hereinafter relative to an optical system 50 shown in FIG. 4. The rays 20, which pass through optical element 10 and then strike a second surface 38b of the reflective coating 38 on lens 32, are reflected off coating 38 and pass through the aperture 16 of the optical element 10 and become focused (imaged) on the image plane 34. It is to be understood that an optional field refocusing lens 40 can be added along longitudinal optical axis 29 behind aperture 16 of optical element 10 to help focus rays 20 onto the image plane 34, if necessary, as is found in standard state-of-the-art optical designs.

The formation of a radial gradient index within the bulk of optical element 10 in accordance with the present invention causes the surface 14b of the optical element 10 to appear aspherical with respect to the ray 20 bending. Accordingly, the effect of an aspherical surface is achieved through the use of a spherical surface in combination with a radial gradient index of refraction in the optical element 10. The advantages of the present optical element 10 and the optical system 30 is that the mirrored lens surfaces remain spherical, are easily manufactured, and eliminate the need for aspherical reflecting surfaces as found in the prior art. It is to be understood that spherical surfaces are generated with state of the art surface generators. More complicated surface generators are necessary for fabricating aspherical surfaces.

Figure 4:
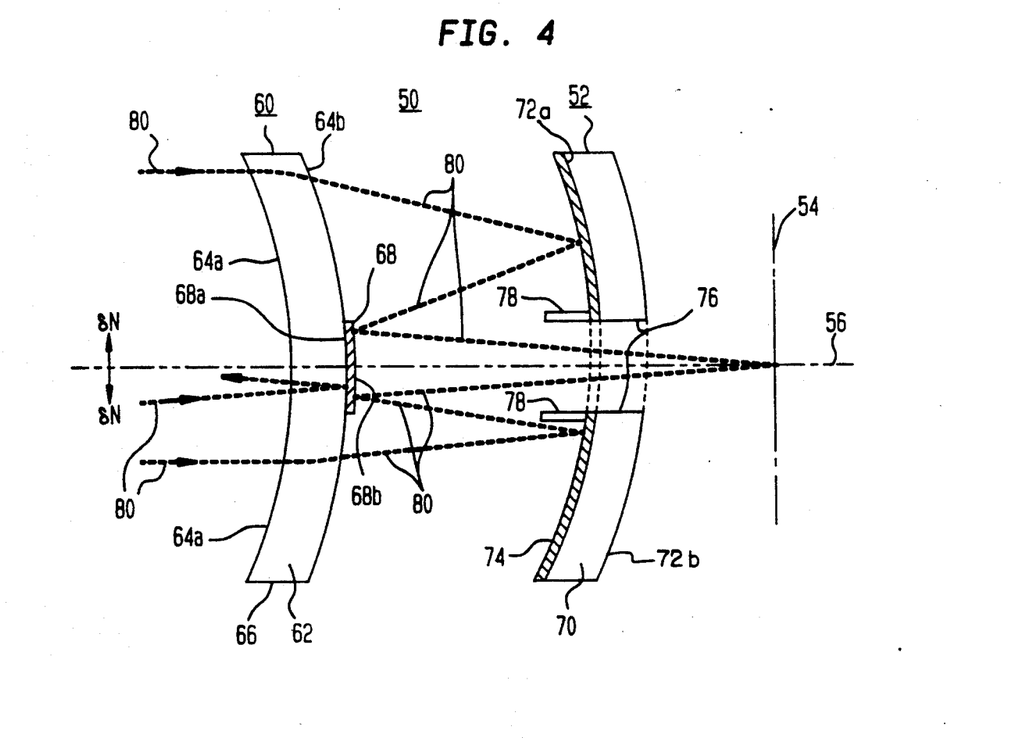
FIG. 4 is a side cross-sectional view through the center of a third optical system in accordance with the present invention.

Referring now to FIG. 4, there is shown an optical system 50 in accordance with the present invention. The system 50 comprises an optical element 60 characterized by a parabolic shaped gradient index profile (as shown in FIG. 2), and a mirror 52 disposed in that sequence along a longitudinal axis 56 of the system 50. An image generated by radiant energy rays 80 incident on system 50 is formed on an image plane 54 disposed behind the mirror 52 along a longitudinal axis 56 of the system 50. The optical element 60 is similar to the optical element 10 of FIG. 1 and comprises a body 62 having a front surface 64a, a rear spherical surface 64b, and a layer 68 of a reflective material disposed on a central portion of the rear spherical surface 64b. The layer 68 of reflective material covers only a small central portion of the rear spherical surface 64b rather than covering the entire rear surface 64b as is the case with layer 18 of the optical element 10 of FIG. 1 which covers all of the rear spherical surface 14b. The optical element 60 is formed of any suitable radiant energy transmitting material with a predetermined parabolic radial gradient index of refraction having the characteristic curve shown in FIG. 2. The mirror 52 comprises a body 70 including a spherical front surface 72a on which a layer 74 of a radiant energy reflective material is formed. A back surface 72b of the body 70, opposite the front surface 72a, may be planar but can comprise any other shape such as spherical or aspherical. The body 70 and the layer 74 define a central aperture 76 therethrough.

In operation, rays 80 of radiant energy arrive from a remote area and enter the front surface 64a of the optical element 60. The rays 80 are bent within body 62 of optical element 60 depending on the gradient of indices of refraction encountered by each ray 80. The rays 80 which propagate in optical element 60 and are incident on a first surface 68a of the reflective layer 68 (adjacent the rear spherical surface 64b of body 62) are reflected back towards the remote area in the manner as rays 20 of lens 32 of FIG. 3 which are incident on the first surface 38a of the layer 38. For illustrative purposes, only one of the rays 80 which are incident on the first surface 68a of the reflective coating 68 is shown.

The majority of the rays 80 which propagate in optical element 60, and are not incident on the first surface 68a of the reflective layer 68, exit the rear surface 64b of optical element 60 and are directed towards the mirror 52. It is to be understood that it is possible for certain rays 80 (not shown) to be bent through the optical element 60 by the gradient index material, and be directed directly into the aperture 76 defined by mirror 52. To prevent such rays 80 from being directed directly through the aperture 76, a baffle 78 surrounding aperture 76 and extending out from the front surface 72 can be used such as shown in U.S. Pat. No. 4,342,503, or any other suitable means. The rays 80 incident on the reflective layer 74 disposed on the spherical front surface 72 of the mirror 52 are reflected back and focused towards a second surface 68b of the reflective layer 68 of the optical element 60. The rays 80 striking the second surface 68b of the reflective layer 68 are reflected in a manner to cause the same to pass through the aperture 76 defined by the mirror 52 and become focused (imaged) on the image plane 54. It is to be understood that the rays 80 passing through body 62, to subsequently become incident on mirror 52, only pass therethrough once. Therefore, the body 62 of optical element 60 requires a larger gradient change ($\delta N$) than is required for the dual pass body 12 of the optical element 10. However, the optical element 60 avoids fresnel reflection interference as might be produced by surface 14a of optical element 10 of FIG. 3.

It is known that the refractive index distribution of a gradient index medium, wherein the gradient index is radial (i.e.. varies with distance from an optical axis through the medium), can be defined by a power series expansion in radius "r" in accordance with the equation:

$$N(r) = N_0 + N_1 r^2 + N_2 r^4 + H_3 r^6 + N_4 r^8 \tag{1}$$

Lens parameters for an exemplary optical system 50, usable for a 35 mm camera lens, are shown in Table I wherein the dimensions are in millimeters unless otherwise indicated Sur = the surface (denoted by its designation) in FIG. 4;
R = the radius of the surface and Th = the thickness.

TABLE I

| Sur | R | Th | $N_0$ | $N_1$ | $N_2$ | $N_3$ |
|---|---|---|---|---|---|---|
| 64a | −60.0 | 4.850084 | 1.560 | −0.001466 | 5.314E-07 | −2.055E-11 |
| 64b | −60.0 | 10.0 | Air | | | |
| 72a | −60.0 | 3+ | (BK7 glass mirror) | | | |
| 72b | Infinity | | | | | |
| 68b | −60.0 | (Mirror diameter = 1.0 mm) | | | | |
| 54 | (Image Plane = 15.0 mm behind back surface of mirror 70) | | | | | |

For Optical Element 60 having a diameter = 10 mm.

Figure 5:
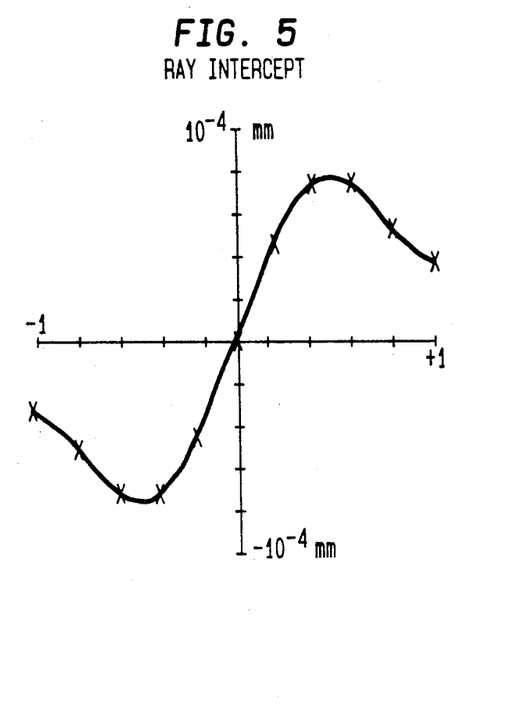
FIG. 5 is a plot showing ray intercept for the optical system of FIG. 4.
Figure 6:
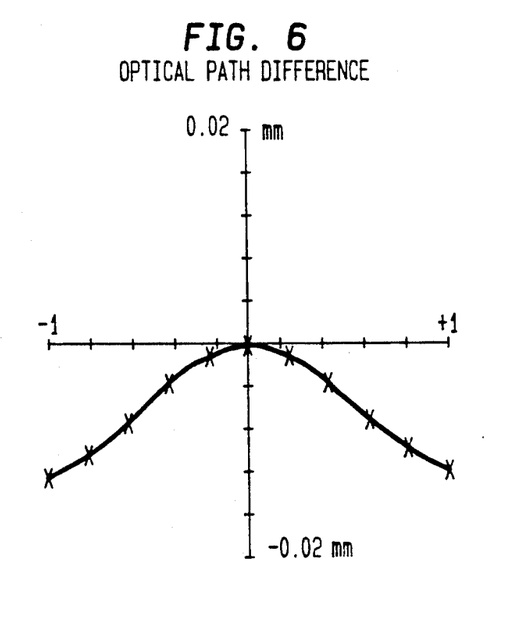
FIG. 6 is a plot showing Optical Path Difference (OPD) for the optical system of FIG. 4.
Figure 7:
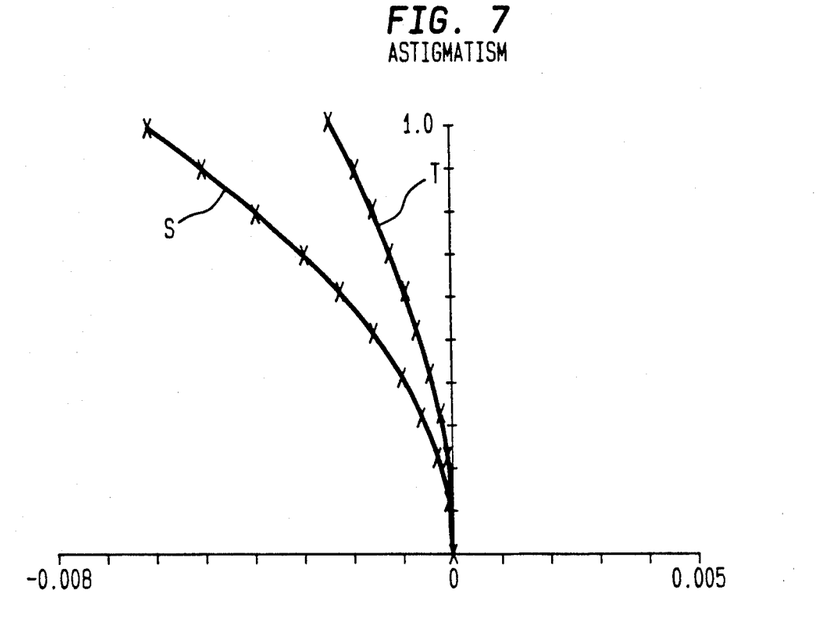
FIG. 7 is a plot of astigmatism for the optical system of FIG. 4.
Figure 8:
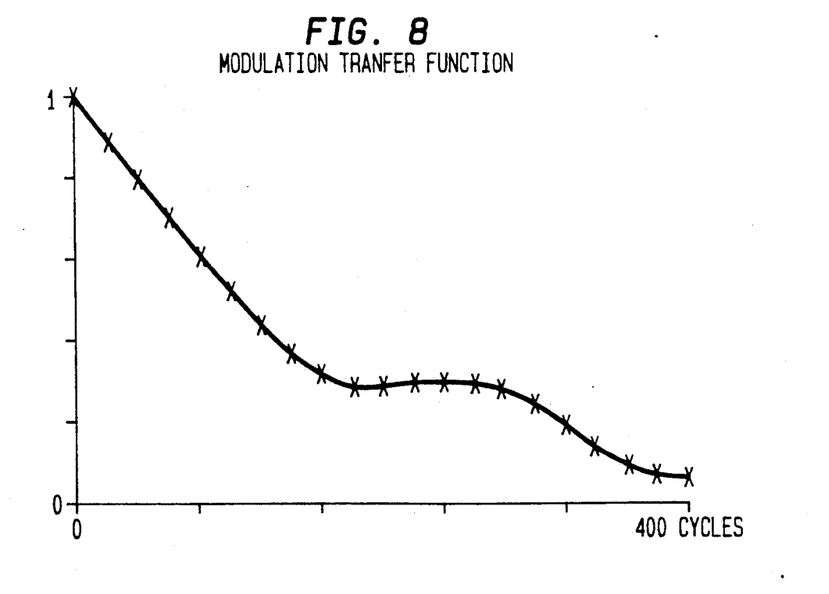
FIG. 8 is a plot of the Modulation Transfer Function (MTF) for the optical system of FIG. 4.
Figure 9:
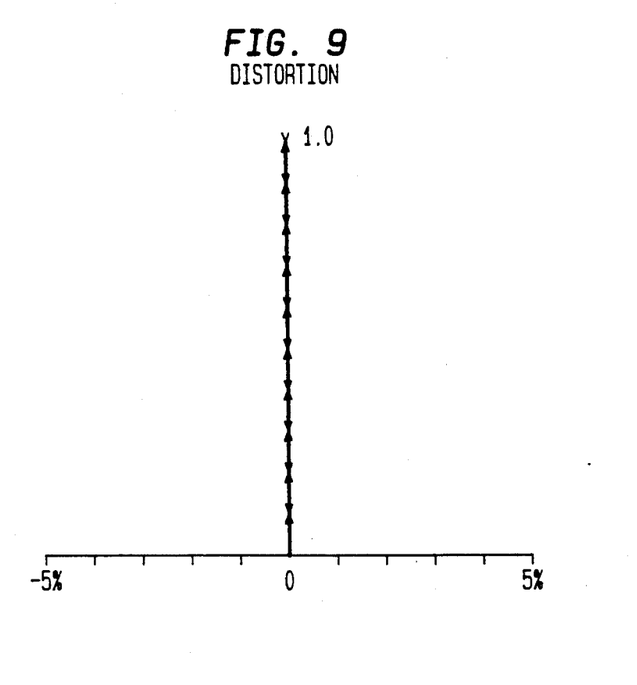
FIG. 9 is a plot of distortion for the optical system of FIG. 4.

$\delta N = 0.0363$ (indicating a decreasing gradient)
Effective Focal Length (EFL) = 34.766
Numerical Aperture (NA) = 0.129
f number = f/3.86
Strehl Ratio = 0.999
Airy Radius = 28 micrometers Referring now to FIGS. 5 to 9, there are shown various aberration performance diagrams (plots) for the exemplary optical system 50 having the parameters indicated above. These plots are self explanatory to those skilled in the art, and are provided to show the ability of the optical system 50 to provide extraordinary aberration correction. FIG. 5 shows a plot of the Ray Intercept performance for the exemplary optical system 50. This plot is interpreted as being minimal spherical aberrations and coma. The y-axis shows the displacement of coplanar rays 80 of FIG. 4 in the image plane 54 of FIG. 4 and the x-axis shows the fractional aperture of those rays 80 in the entrance pupil. FIG. 6 shows a plot of the Optical Path Difference for the exemplary optical system 50 of FIG. 4. The Optical Path Difference is typically defined as the distance between a set of rays and a reference ray. FIG. 7 shows a plot of normalized Astigmatism for the exemplary optical system 50 where "S" represents the plot for the Sagittal rays and "T" represents the plot for the Tangential rays. FIG. 8 shows a plot of the normalized Modulation Transfer Function for the exemplary optical system 50. FIG. 9 is a plot of normalized Distortion for the exemplary optical system 50 showing that there is no distortion and the lens has uniform magnification across the image plane.

It is to be appreciated and understood that the specific embodiments of the invention are merely illustrative of the general principles of the invention. Various modifications may be made consistent with the principles set forth. For example, the optical system 10 can be formed for any type of radiant energy such as light, infrared, etc. using a suitable gradient index radiant energy transmitting material for the particular radiant energy used.

What is claimed is:

1. An optical element comprising:
a body with a first curved surface and an opposing second spherical surface which each extend radially outwards from a longitudinal axis of the optical element, the body comprising a radiant energy transmitting material having a radial gradient index of refraction of a preselected profile; and
a layer of a radiant energy reflective material formed on at least a portion of the second spherical surface.

2. The optical element of claim 1 wherein:
the first curved surface is concave; and
the second spherical surface is convex.

3. The optical element of claim 1 wherein the optical element defines an aperture therethrough centered on the longitudinal axis.

4. The optical element of claim 1 wherein the gradient index of refraction of the radiant energy transmitting material of the body decreases as the distance from the longitudinal axis of the optical element increases.

5. The optical element of claim 1 wherein the gradient index of refraction of the radiant energy transmitting material of the body increases as the distance from the longitudinal axis of the optical element decreases.

6. The optical element of claim 1 wherein the layer of a radiant energy reflective material covers essentially all of the second spherical surface.

7. The optical element of claim 1 wherein a coating of an antireflective material covers essentially all of the first surface.

8. An optical system having a longitudinal axis and comprising:
a first optical element comprising a body with a spherical surface which extends radially outwards from the longitudinal axis of the optical system, and a layer of a radiant energy reflective material disposed on at least a portion of the spherical surface of the first optical element and
a second optical element spaced apart and disposed behind the first optical element and comprising a body with a spherical surface which extends radially outwards from the longitudinal axis of the optical system, and a layer of a radiant energy reflective material disposed on at least a portion of the surface of the second optical element and
the body of at least one of the first and second optical elements comprises a radiant energy transmitting material having a radial gradient index of refraction of a preselected profile.

9. The optical system of claim 10 wherein:
the spherical surface of the body of the spherical element has the layer of reflective material disposed on a central portion thereof;
the body of the second optical element defines a central aperture, comprises the material having a radial gradient index of refraction, and the spherical surface is covered by the layer of reflective material and is a rear surface of the body.

10. The optical system of claim 9 wherein radiant energy arriving from a remote area and incident on the first optical element is refracted by each of the first and second optical elements and is reflected in sequence by the layer of reflective material on the spherical surface of the body of the second and then the first optical element before being focused onto a predetermined image plane disposed to the rear of the second optical element.

11. The optical system of claim 8 wherein:
the body of the first optical element comprises the material having a radial gradient index of refraction, and the layer of reflective material is formed on a central portion of the spherical surface of the body of the first optical element; and
the second optical element is a mirror and defines an aperture in the center thereof, and the spherical surface of the body thereof covered with the layer of reflective material and is a front surface of the body of the second element.

12. The optical system of claim 11 wherein radiant energy arriving from a remote area and incident on the first optical element is refracted by the body of the first optical element and is reflected in sequence by the layers of reflective material on the spherical surface of the body of the second and the first optical element and is then focused onto a predetermined image plane disposed to the rear of the second optical element.

13. The optical system of claim 8 wherein:
the spherical surface of the body of each of the first and second optical elements is convex.

14. The optical system of claim 8 wherein the gradient index of refraction decreases parabolically as the distance from the longitudinal axis increases in the body of the at least one of the first and second optical elements comprising the gradient index.

15. The optical system of claim 8 wherein the gradient index of refraction increases as the distance from the longitudinal axis decreases in the body of the at least one of the first and second optical elements comprising the gradient index.

16. The optical system of claim 8 wherein the gradient index of refraction increases parabolically as the distance from the longitudinal axis decreases in the body of the at least one of the first and second optical elements comprising the gradient index.

17. An optical system having a longitudinal axis and comprising:
a first optical element comprising a body with a first surface and a second opposing spherical surface which each extend radially outwards from a longitudinal axis of the first optical element, the body comprising a radiant energy transmitting material having a homogeneous index of refraction, and a layer of a radiant energy reflective material disposed on a portion of either one of the first and second surfaces; and
a second optical element comprising a body with a first surface and a second opposing spherical surface which each extend radially outwards from the longitudinal axis of the optical system, and the body of the second optical element comprises a radiant energy transmitting material having a radiant gradient index of refraction of a preselected profile, and comprises a layer of a radiant energy reflective material disposed on the second surface of the second optical element.

18. The optical system of claim 17 wherein:
the first surface of the second optical element is concave; and
the second surface of the second optical element is convex.

19. The optical system of claim 17 wherein the second optical element defines an aperture therethrough along the longitudinal axis.

20. The optical system of claim 17 wherein the gradient index of refraction of the radiant energy transmitting material of the body of the second optical element decreases as the distance from the longitudinal axis increases.

21. The optical system of claim 20 wherein the gradient index of refraction of the radiant energy transmitting material of the body of the second optical element decreases parabolically as the distance from the longitudinal axis increases.

22. The optical system of claim 17 wherein the gradient index of refraction of the radiant energy transmitting material of the body of the second optical element increases as the distance from the longitudinal axis decreases.

23. The optical system of claim 17 wherein the gradient index of refraction of the radiant energy transmitting material of the body of the second optical element increases parabolically as the distance from the longitudinal axis decreases.

24. The optical system of claim 17 wherein each layer of a radiant energy reflective material is disposed on the second surface of the first optical element.

25. A optical system comprising:
an optical element comprising a body with a first surface and a second opposing spherical surface which each extend radially outwards from a longitudinal axis of the optical system, the body comprising a radiant energy transmitting material having a radial gradient index of refraction of a preselected profile, and a layer of a radiant energy reflective material disposed on at least a portion of the second surface; and
a mirror disposed along the longitudinal axis of the optical system comprising a curved focusing surface extending radially outward from the longitudinal axis and having a layer of a radiant energy reflective material disposed thereon.

26. The optical system of claim 25 wherein the optical element and the mirror are separated from each other such that radiant energy incident on the first surface of the optical element passes through a portion of the optical element not defined by the layer of radiant reflective material and is reflected by the mirror onto the layer of radiant reflective material of the optical element for imaging onto an image plane.

27. The optical system of claim 26 wherein:
the first curved surface of the optical element is concave; and
the second surface of the optical element is convex.

28. The optical system of claim 25 wherein the mirror further defines an aperture therethrough centered on the longitudinal axis for passing the radiant energy reflected from the layer of a radiant energy reflective material disposed on the second surface or the optical element and imaging the radiant energy onto an image plane.

29. The optical system of claim 25 wherein the gradient index of refraction of the radiant energy transmitting material decreases as the distance from the longitudinal axis increases in the body of the optical element.

30. The optical system of claim 29 wherein the gradient index of refraction of the radiant energy transmitting material decreases parabolically as the distance from the longitudinal axis increases in the body of the optical element.

31. The optical system of claim 25 wherein the gradient index of refraction of the radiant energy transmitting material increases as the distance from the longitudinal axis decreases in the body of the optical element.

32. The optical system of claim 31 wherein the gradient index of refraction of the radiant energy transmitting material increases parabolically as the distance from the longitudinal axis increases in the body of the optical element.

33. An optical element comprising:
a body with a first curved surface and an opposing second spherical surface which each extend radially outwards from a longitudinal axis of the optical element, the body comprising a radiant energy transmitting material having a radial gradient index of refraction which decreases parabolically as the distance from the longitudinal axis of the optical element increase; and
a layer of a radiant energy reflective material formed on at least a portion of the second spherical surface.

34. An optical element comprising:
a body with a first curved surface and an opposing second spherical surface which each extend radially outwards from a longitudinal axis of the optical element, the body comprising a radiant energy transmitting material having a radial gradient index of refraction which increases parabolically as the distance from the longitudinal axis of the optical element decreases; and
a layer of a radiant energy reflective material formed on at least a portion of the second spherical surface.

* * * * *